(12) United States Patent
Brunner et al.

(10) Patent No.: US 12,723,417 B2
(45) Date of Patent: Sep. 1, 2026

(54) SELF-CLIMBING SYSTEM FOR A CONCRETE STRUCTURAL BODY, AND SELF-CLIMBING METHOD

(71) Applicant: PERI SE, Weissenhorn (DE)

(72) Inventors: Werner Brunner, Buch (DE); Andre Zwerenz, Pfaffenhofen (DE)

(73) Assignee: PERI SE, Weissenhorn (DE)

( * ) Notice: Subject to any disclaimer, the term of this patent is extended or adjusted under 35 U.S.C. 154(b) by 620 days.

(21) Appl. No.: 18/246,229

(22) PCT Filed: Sep. 3, 2021

(86) PCT No.: PCT/EP2021/074401
§ 371 (c)(1),
(2) Date: Mar. 22, 2023

(87) PCT Pub. No.: WO2022/063547
PCT Pub. Date: Mar. 31, 2022

(65) Prior Publication Data

US 2023/0358060 A1 Nov. 9, 2023

(30) Foreign Application Priority Data

Sep. 22, 2020 (DE) ..................... 10 2020 124 646.3

(51) Int. Cl.
*E04G 11/24* (2006.01)
*E04G 11/28* (2006.01)
*F16M 13/02* (2006.01)

(52) U.S. Cl.
CPC .............. *E04G 11/24* (2013.01); *E04G 11/28* (2013.01); *F16M 13/022* (2013.01)

(58) Field of Classification Search
CPC ... E04G 11/24; E04G 11/28; E04G 2003/286; E04G 5/04
USPC .......................................................... 180/191
See application file for complete search history.

(56) References Cited

U.S. PATENT DOCUMENTS 5,630,482 A 5/1997 Schwoerer
2007/0119116 A1 5/2007 Arozena Bergaretxe

FOREIGN PATENT DOCUMENTS

| | | | | | |
|---|---|---|---|---|---|
| EP | 0681635 B1 | | 7/1996 | | |
| EP | 1698746 A1 | * | 9/2006 | ............. | E04G 11/28 |
| EP | 2995749 A1 | | 3/2016 | | |
| KR | 100704720 B1 | * | 4/2007 | ............. | E04G 3/325 |
| WO | WO-2008148637 A1 | * | 12/2008 | ............. | E04G 11/28 |

* cited by examiner

*Primary Examiner* — Cassandra Davis
(74) *Attorney, Agent, or Firm* — SLEMAN & LUND LLP

(57) ABSTRACT

A self-climbing system for a concrete structural body, having a climbing rail and having a climbing unit which is axially movable along the climbing rail, wherein a control rod is designed, in predetermined positions of a linear drive, to apply a torque to at least one of the actuating elements. The present disclosure relates to a self-climbing method.

19 Claims, 10 Drawing Sheets

SELF-CLIMBING SYSTEM FOR A CONCRETE STRUCTURAL BODY, AND SELF-CLIMBING METHOD

FIELD

The present invention relates to a self-climbing system for a concrete structural body, having a climbing rail and having a climbing unit which is axially movable along the climbing rail.

The present invention further relates to a method for climbing of a climbing unit on a climbing rail arranged on a concrete structural body.

BACKGROUND

In automatic self-climbing systems, the climbing mechanism is capable of both climbing up a climbing rail and climbing up a climbing scaffold that can be connected to the climbing mechanism. By means of a switchable climbing mechanism, the climbing rails are first climbed up into the fresh concrete portion, moved between the wall and the formwork, and then the support frame with climbing unit is climbed up.

When climbing the climbing rail, an actuating element of a climbing head sits under a latching block of the climbing rail. When climbing the support frame, the actuating element of the climbing head rests on a latching block of the climbing rail. When moving to the end position, cams in the climbing heads are switched via switching gates on the climbing rail, thereby taking the actuating elements with them, which then snap back onto or under the locking blocks of the climbing rail, depending on the setting.

A hydraulic aggregate has a controller with which the cylinders can be extended and retracted. In order for the support frame to be climbed up, the rail must have been climbed up beforehand and fixed in place.

The disadvantage of this solution is that the climbing rail must have a plurality of switching gates in order to initiate the switching operations for positioning the actuating elements of the respective climbing heads.

EP 0 681 635 B1 discloses a self-climbing device for a climbing scaffold having at least one linear drive which generates a relative movement between at least one moving console and at least one mounting rail extending in the direction of movement, in particular when the linear drive alternately moves a section of the scaffold and the mounting rail by one working section, after the section of scaffold is secured to the wall and the mounting rail is loosened.

The connection between the linear drive and the mounting rail is ensured by mutually spaced apart climbing heads.

A locking member is lifted above the locking cam during the relative movement in one direction, and when moved in the other movement direction is stopped by the locking cam, so that one climbing head is form-fittingly secured to the mounting rail, blocking the relative movement, while a relative movement overcoming the locking cam takes place at the other climbing head.

Consequently, there is a need to improve existing self-climbing systems and methods to provide a simpler concept for switching actuating elements in automatic climbing systems which is also less prone to errors.

It is therefore the object of the invention to provide a self-climbing system and a corresponding method which enable simplified, less error-prone switching of actuating elements in automatic climbing systems.

SUMMARY

The object is solved according to the invention by a self-climbing system for a concrete structural body, having a climbing rail and having a climbing unit which is axially movable along the climbing rail as well as a method for climbing of a climbing unit on a climbing rail arranged on a concrete structural body.

The invention relates to a self-climbing system for a concrete structural body, having a climbing rail and having a climbing unit which is axially movable along the climbing rail and which has a first climbing head, a second climbing head, and a linear drive connecting the first climbing head to the second climbing head, wherein the first climbing head and the second climbing head each have an actuating element which is adjustable between a climbing position and a latching position, in particular of the climbing unit, wherein the actuating element of the first climbing head and the actuating element of the second climbing head are connected by a control rod, and wherein the control rod is designed, in predetermined positions of the linear drive, to apply a torque to at least one of the actuating elements.

The invention further relates to a method for climbing of a climbing unit on a climbing rail arranged on a concrete structural body. The method comprises providing a first climbing head, a second climbing head, and a linear drive connecting the first climbing head to the second climbing head.

The method further comprises providing the first climbing head and the second climbing head each with an actuating element adjustable between a climbing position and a latching position, in particular of the climbing unit, wherein the actuating element of the first climbing head and the actuating element of the second climbing head are connected by a control rod.

The method further comprises, in predetermined positions of the linear drive, applying a torque to at least one of the actuating elements by the control rod.

An idea of the present invention is to dispense with the control gate on the climbing rail by controlling the actuating elements by means of the control rod. As a result, less damage occurs and the operation of the latching mechanism functions independently of friction with fewer malfunctions. Further, the restoring forces are lower with this type of actuation and place less stress on the gate bearing.

In addition, the climbing rails are easier and less expensive to manufacture due to the fact that control gates are no longer required.

Furthermore, the solution according to the invention can also be used in combination with existing climbing rails with which the climbing unit according to the invention is compatible. The solution according to the invention thus advantageously results in significantly fewer signs of wear on the climbing unit and climbing rail.

Further embodiments of the present invention are the subject matter of the further subclaims and the following description with reference to the figures.

In accordance with a preferred development, it is provided that the actuating element of the first climbing head and the actuating element of the second climbing head, when passing over a latching block of a plurality of latching blocks arranged on the climbing rail caused by axial movement of the linear drive, is movable from the latching position in which the actuating element is arranged at least in portions in the plane of the latching block to the climbing position in which the actuating element is arranged outside the plane of the latching block. The interaction of the at least one actuating element with the latching block arranged on the climbing rail thus advantageously causes the respective actuating element to switch between the climbing position and the latching position.

In accordance with a further preferred development, it is provided that the control rod has an outer tube and an inner tube or shaft which can be extended and retracted from the outer tube, wherein the control rod, when moving the linear drive to a first axial end position, in particular to a fully extended position, is designed to generate a switching pulse in order to move the actuating element of the first climbing head or of the second climbing head which is arranged in the climbing position from the climbing position to the latching position.

The control rod thus advantageously allows a respective actuating element to be set or positioned in the latching position.

In accordance with a further preferred development, it is provided that a stroke of the linear drive is substantially identical or with a deviation of up to 15% to a stroke of the control rod, wherein, upon reaching a first axial end position of the control rod, the climbing unit is designed to move the actuating element of the first climbing head or of the second climbing head which is arranged in the climbing position from the climbing position to the latching position. The control rod can thus advantageously be moved along at a movement of the linear drive, wherein the control rod performs its control action only at respective end positions of the stroke of the linear drive.

In accordance with a further preferred development, it is provided that when the linear drive is moved to a second axial end position, in particular a fully retracted position, the control rod is designed to move the actuating element of the first climbing head or of the second climbing head which is arranged in the climbing position from the climbing position to the latching position.

Thus, the control rod advantageously exhibits a corresponding actuating action both in the first axial end position and in the second axial end position of the control cylinder for adjusting the respective climbing head from the climbing position to the latching position.

In accordance with a further preferred development, when the control rod reaches the second axial end position, the climbing unit is designed to move the actuating element of the first climbing head or the of second climbing head which is arranged in the climbing position from the climbing position to the latching position. The control rod can thus advantageously be moved along at a movement of the linear drive, wherein the control rod performs its control action only at respective end positions of the stroke of the linear drive.

In accordance with a further preferred development, it is provided that the actuating element of the first climbing head and the actuating element of the second climbing head are arranged on an axis of rotation on the respective climbing head, and wherein the control rod on the respective actuating element is arranged eccentrically to the axis of rotation. Due to the eccentric arrangement or connection of the control rod to the respective actuating element, the control rod can thus perform its control action of the actuating element in an advantageous manner.

In accordance with a further preferred development, it is provided that the climbing unit is designed in such a manner that, when the climbing unit is operated in the climbing position, i.e., in the rail-climbing or console-climbing position, the actuating element of the first climbing head or of the second climbing head is supported on a latching block arranged on the climbing rail, and wherein the other actuating element can be actuated by the control rod. In climbing mode, one of the actuating elements can thus be actuated by the control rod in an advantageous manner.

In accordance with a further preferred development, it is provided that the outer tube and the inner tube or the shaft of the control rod have a spring element, in particular a spiral spring, at one stroke end, which initiates the actuation of the actuating element of the first climbing head and/or of the second climbing head. A length of the spring elements is advantageously adjusted in such a manner that no damage to the control rod occurs due to tolerances and that it is possible to switch the switching points from a rail-climbing mode to a console-climbing mode.

In accordance with a further preferred development, it is provided that the inner tube, in particular at the stroke end, has an external thread at least in portions, at the end of which a nut is arranged, wherein the nut forms a stop which abuts against a counter stop, in particular a diameter reduction, of the outer tube.

Thus, an end stop of the head tube adjustable by the nut can be provided in an advantageous manner.

In accordance with a further preferred development, it is provided that the control rod has a handle which, when actuated, in particular by a user, is designed to move the actuating element of the first climbing head or of the second climbing head between the climbing position and the latching position. Thus, the climbing unit is advantageously designed to be switched from the rail-climbing mode to the console-climbing mode by a user at any time, if required.

In accordance with a further preferred development, it is provided that the linear drive is formed by an actuating cylinder, which has a piston rod axially adjustable in a cylinder, wherein the piston rod is connected at an axial end portion to the first climbing head, and wherein the cylinder is connected at an axial end portion to the second climbing head. This means that the first climbing head can be moved axially and the second climbing head can be fixed axially.

In accordance with a further preferred development, it is provided that the actuating element of the first climbing head and the actuating element of the second climbing head are each designed to be substantially star-shaped, wherein the actuating element has a radially aligned first flank, a radially aligned second flank, and a radially aligned third flank.

In accordance with a further preferred development, it is provided that the control rod is connected to the first flank of the actuating element of the first climbing head and the actuating element of the second climbing head, and wherein the second flank of the actuating elements is designed to rest on the latching block in the latching position of the climbing unit.

In accordance with a further preferred development, it is provided that the actuating element of the first climbing head and the actuating element of the second climbing head, when passing over a latching block of a plurality of latching blocks arranged on the climbing rail caused by axial movement of the linear drive, is moved from the latching position in which the actuating element is arranged at least in portions in the plane of the latching block to the climbing position in which the actuating element is arranged outside the plane of the latching block. The interaction of the at least one actuating element with the latching block arranged on the climbing rail thus advantageously causes the respective actuating element to switch between the climbing position and the latching position.

In accordance with a further preferred development, it is provided that when the linear drive is moved to a first axial end position, in particular a fully retracted or extended position, the control rod generates a switching pulse to move the actuating element of the first climbing head or of the second climbing head which is arranged in the climbing position from the climbing position to the latching position. The control rod thus advantageously allows a respective actuating element to be set or positioned in the latching position.

The described embodiments and further developments can be combined with one another as desired.

Further possible embodiments, further developments and implementations of the invention also comprise combinations of features of the invention not explicitly mentioned before or described below with respect to the embodiments.

BRIEF DESCRIPTION OF THE DRAWINGS

The accompanying drawings are intended to provide a further understanding of embodiments of the invention. They illustrate embodiments and, in connection with the description, serve to explain principles and concepts of the invention.

Further embodiments and many of the advantages mentioned will be apparent with reference to the drawings. The elements shown in the drawings are not necessarily shown to scale relative to one another.

In the drawings:

FIG. 1 to FIG. 9 show a schematic representation of a self-climbing system for a concrete structural body in accordance with a preferred embodiment of the invention; and FIG. 10 shows a flowchart of a method for climbing of a climbing unit in accordance with the preferred embodiment of the invention.

In the figures of the drawings, identical reference signs denote identical or functionally identical elements, parts, or components, unless otherwise indicated.

DETAILED DESCRIPTION

Figure 1:
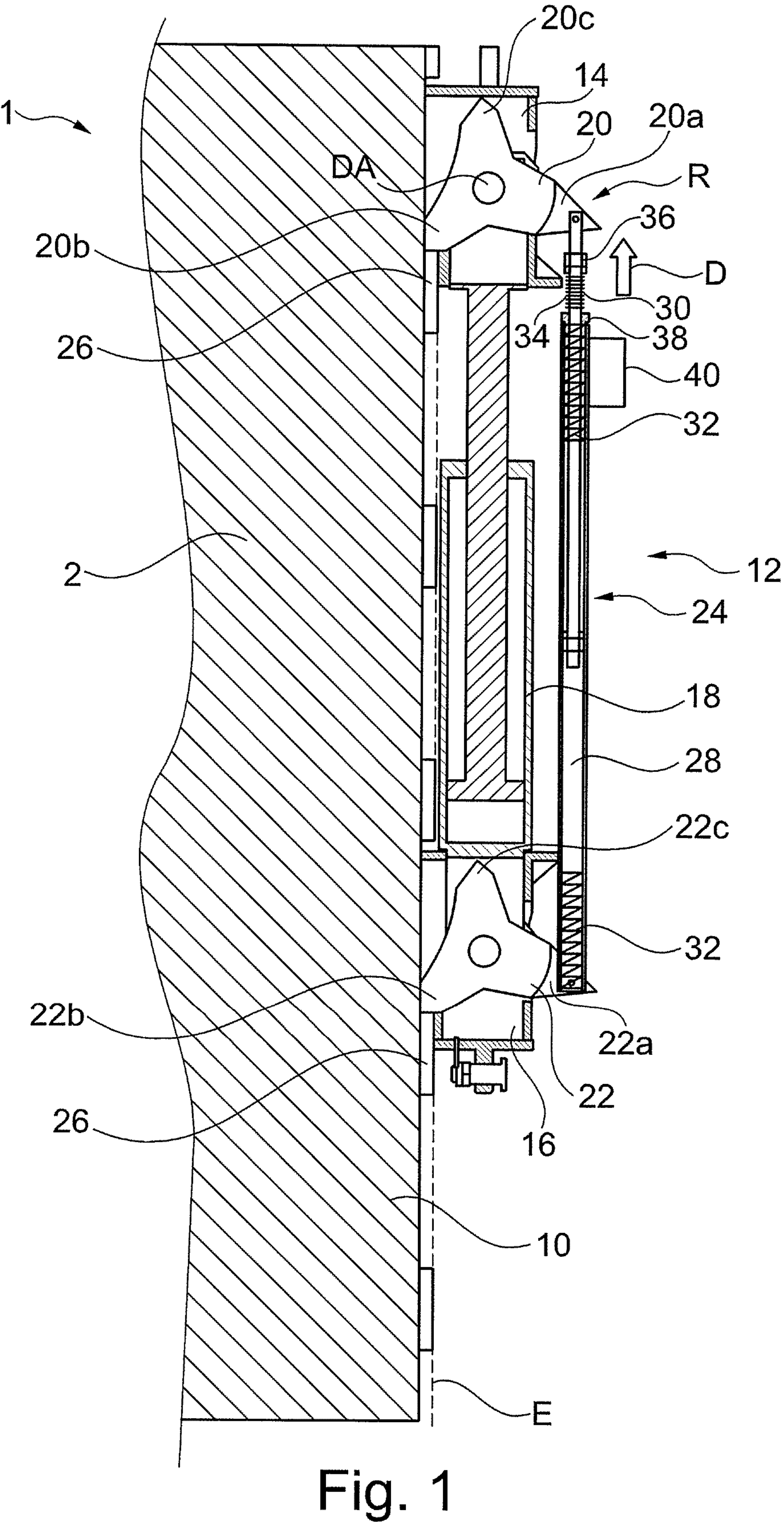

FIG. 1 shows a schematic representation of a self-climbing system for a concrete structural body in accordance with a preferred embodiment of the invention.

The self-climbing system 1 has a climbing rail 10 and a climbing unit 12 that is axially movable along the climbing rail. The climbing unit 12 has a first climbing head 14, a second climbing head 16, and a linear drive 18 connecting the first climbing head 14 to the second climbing head 16.

The first climbing head 14 and the second climbing head 16 each have an actuating element 20, 22 which is adjustable between a climbing position K and a latching position R, in particular of the climbing unit 12. The actuating element 20 of the first climbing head 14 and the actuating element 22 of the second climbing head 16 are connected by a control rod 24.

The control rod 24 is designed, in predetermined positions of the linear drive 18, to apply a torque D to one of the actuating elements 20, 22 in order to rotate the respective actuating element 20, 22.

The actuating elements 20, 22 are designed to be substantially star-shaped in side view, wherein the actuating element 20 of the first climbing head 14 and the actuating element 22 of the second climbing head 16 are each arranged on or connected to the respective climbing head 14, 16 at their axis of rotation DA. The control rod 24 is arranged on the respective actuating element 20, 22 eccentrically to the axis of rotation.

The actuating elements 20, 22, which in the present embodiment are designed to be substantially star-shaped, are arranged with the control rod 24 at an end portion of a tapering projection or arm of the respective actuating element.

Alternatively, the actuating elements 20, 22 may have another suitable shape. Exemplary suitable shapes are circular, hollow circular, triangular or cuboid.

The control rod 24 is formed in two parts and has an outer tube 28 and an inner tube 30 that extends and retracts from the outer tube 28. The inner tube 30 is freely movable within the outer tube 28 within a predetermined stroke. Alternatively, a shaft may be provided instead of the inner tube 30, for example.

The outer tube 28 and the inner tube 30, or alternatively the shaft of the control rod 24, further have a spring element 32, particularly a coil spring, at one stroke end. The spring element 32 initiates actuation of the actuating element 20, 22 of the first climbing head 14 and/or of the second climbing head 16.

In addition, the inner tube 30 has, in particular at the stroke end, an external thread 34 at least in portions, at the end of which a nut 36 is arranged.

The nut 36 forms a stop which abuts against a counter stop 38, in particular a diameter reduction of the outer tube 28.

In the present representation, both the actuating element 20 of the first climbing head 14 and the actuating element 22 of the second climbing head 16 are each supported on a latching block 26.

The actuating element 20 of the first climbing head 14 and the actuating element 22 of the second climbing head 16 are each designed to be substantially star-shaped, wherein the actuating element 20, 22 has a radially aligned first flank 20*a*, 22*a*, a radially aligned second flank 20*b*, 22*b*, and a radially aligned third flank 20*c*, 22*c*.

The control rod 24 is connected to the first flank 20*a*, 22*a* of the actuating element 20 of the first climbing head 14 and the actuating element 22 of the second climbing head 16. The second flank 20*b*, 22*b* of the actuating elements 20, 22 is designed to rest on the latching block 26 in the latching position R of the climbing unit 12.

Figure 2:
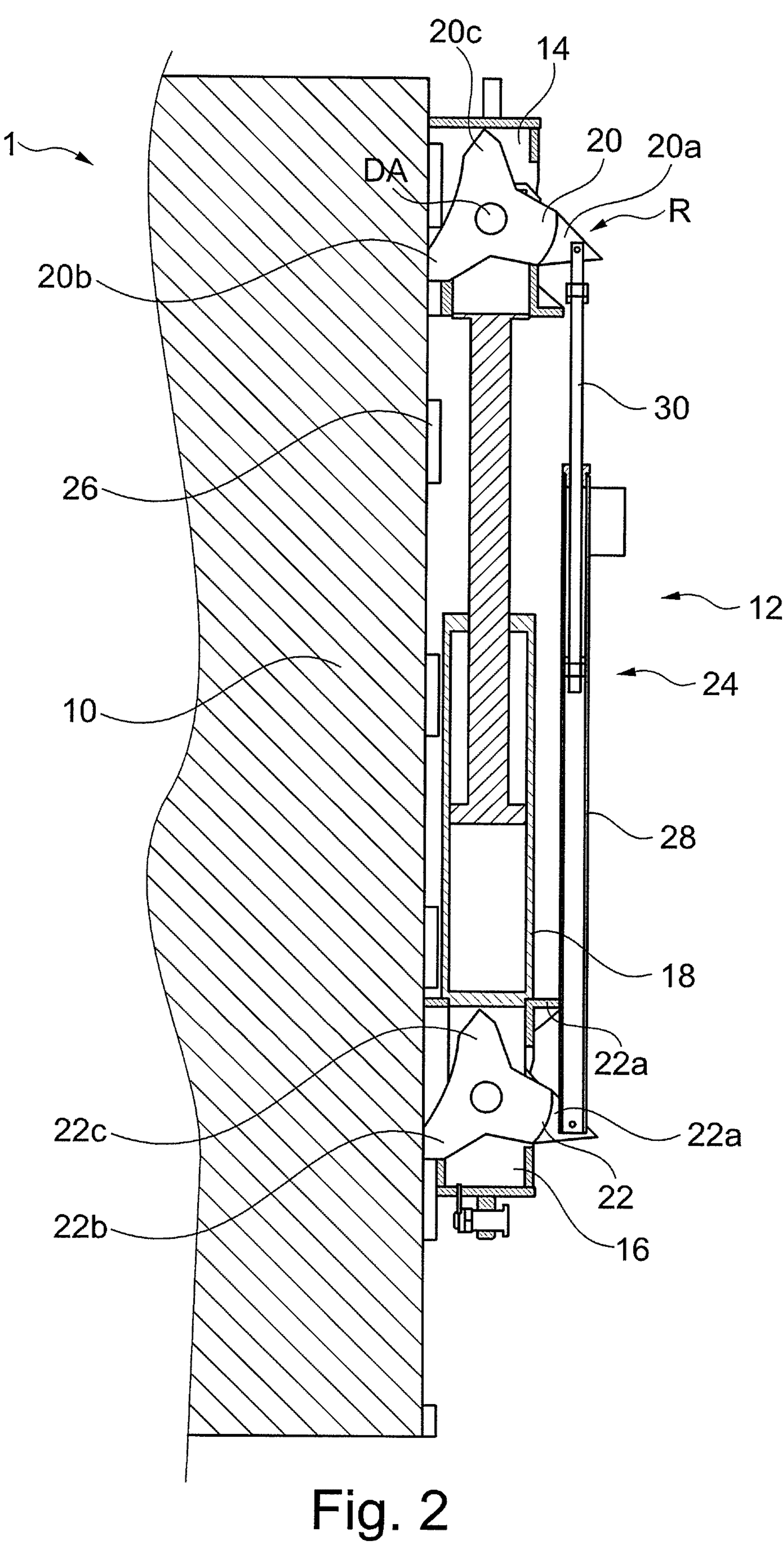

FIG. 2 shows a schematic representation of a self-climbing system for a concrete structural body in accordance with the preferred embodiment of the invention. In the present representation, the linear drive 18 is extended slightly further than in FIG. 1, such that the actuating element 20 of the first climbing head 14 is lifted off the latching block 26, but is still arranged in the latching position R. The actuating element 22 of the second climbing head 16 continues to be supported on a latching block 26 of the plurality of latching blocks.

Figure 3:
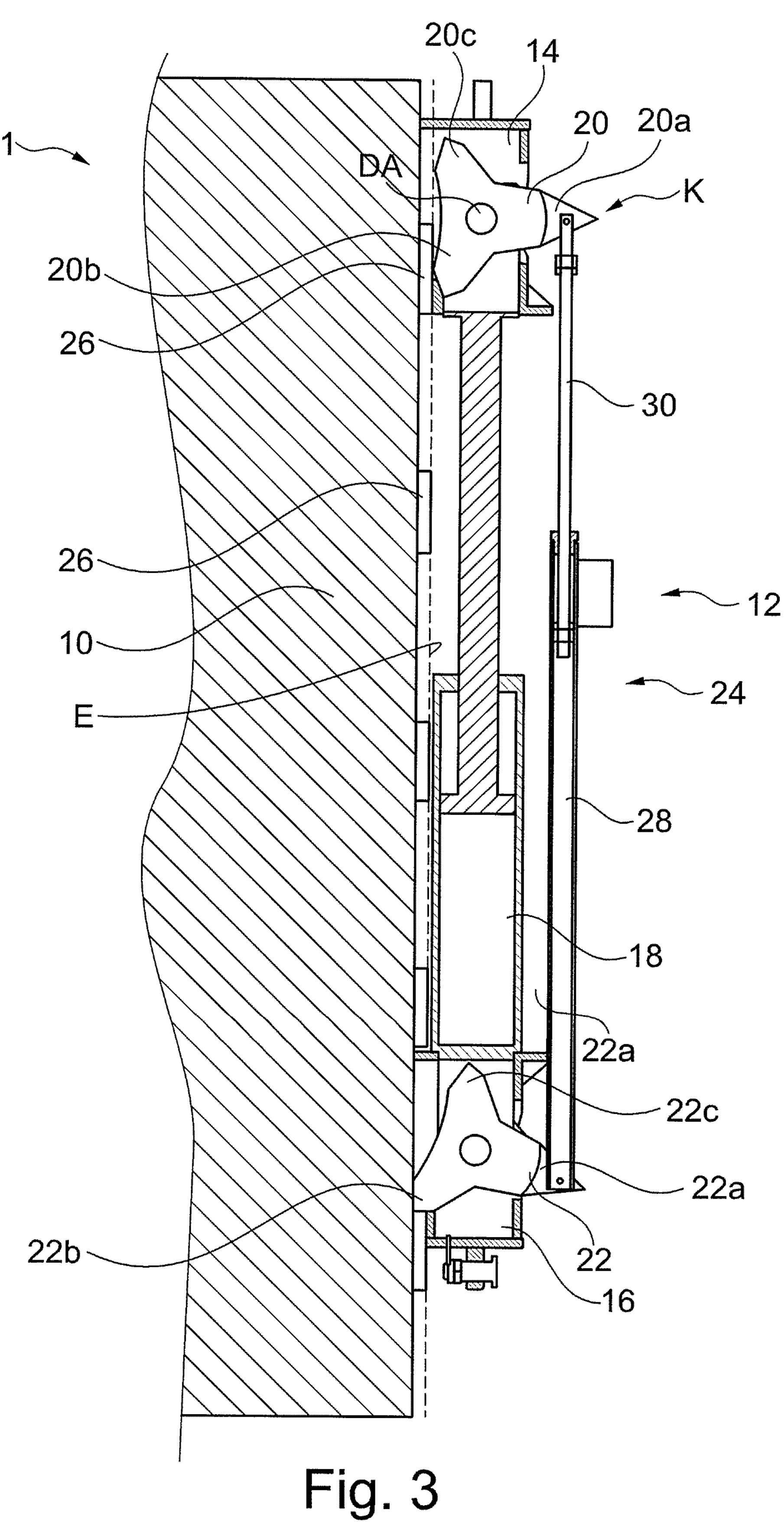

FIG. 3 shows a schematic representation of a self-climbing system for a concrete structural body in accordance with the preferred embodiment of the invention.

In the present representation, the linear drive 18 is extended a little further than in FIG. 2. Due to contact of an arm of the star-shaped actuating element 20 of the first climbing head 14 with a latching block 26 the actuating element 20 was moved from the latching position R to the climbing position K.

The actuating element 20 of the first climbing head 4 rotates about the axis of rotation DA, on which the actuating element 20 is mounted on the first climbing head 14.

The actuating element 20 of the first climbing head 14 is thus now no longer arranged in the plane E of the latching block 26, but outside the plane E of the latching block 26.

Figure 4:
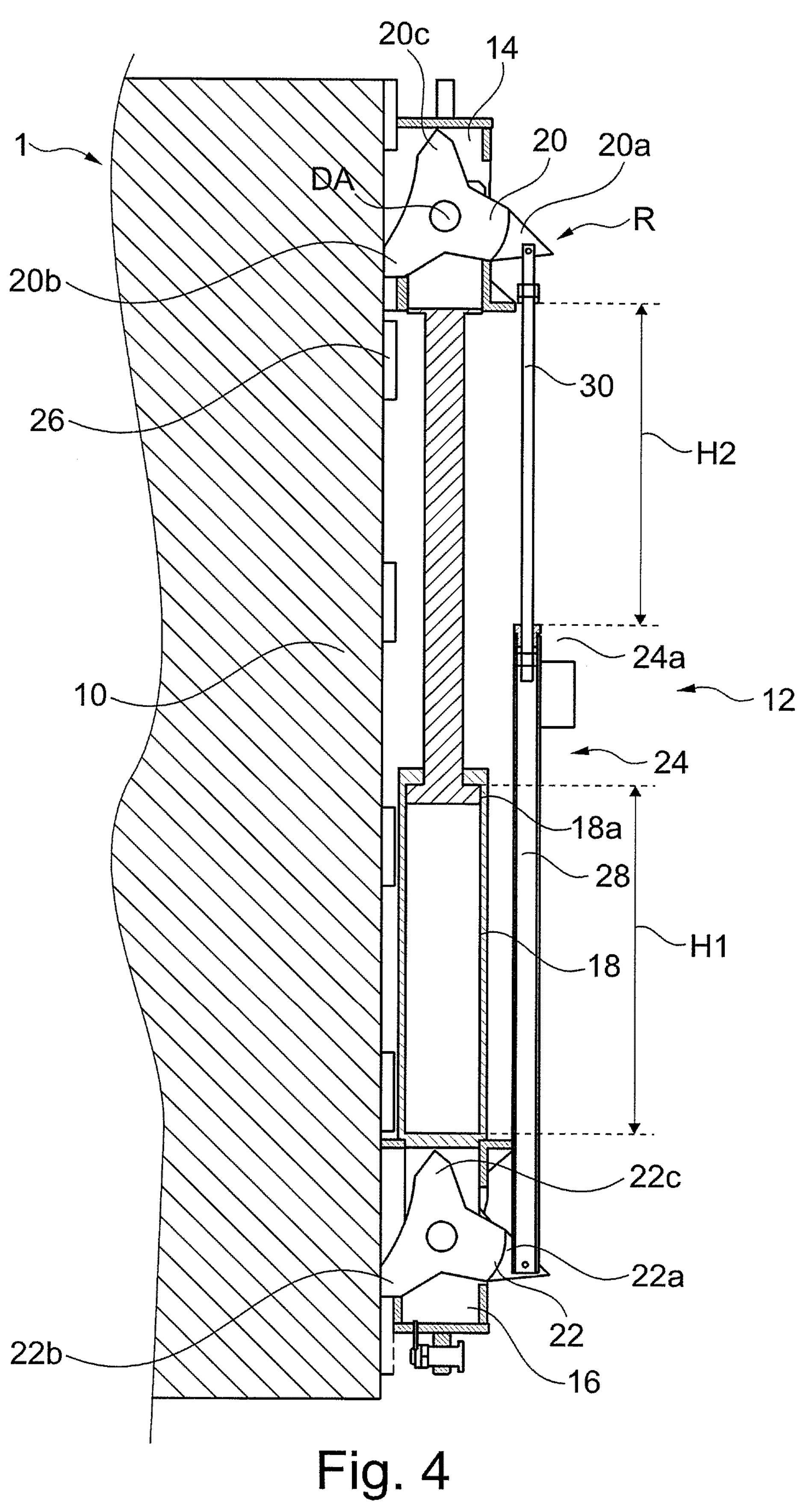

FIG. 4 shows a schematic representation of a self-climbing system for a concrete structural body in accordance with the preferred embodiment of the invention. In the representation shown in FIG. 4, the linear drive 18 is set in its first axial end position 18*a*, i.e., in a fully extended position.

A stroke H1 of the linear drive 18 is substantially identical to a stroke H2 of the control rod 24.

Alternatively, the stroke H1 of the linear drive 18 may have a deviation of up to 15% from a stroke H2 of the control rod 24, for example.

When the first axial end position 24*a* of the control rod 24 is reached, the climbing unit 12 is designed to move the actuating element 20 of the first climbing head which is arranged in the climbing position from the climbing position to the latching position R.

Figure 5:
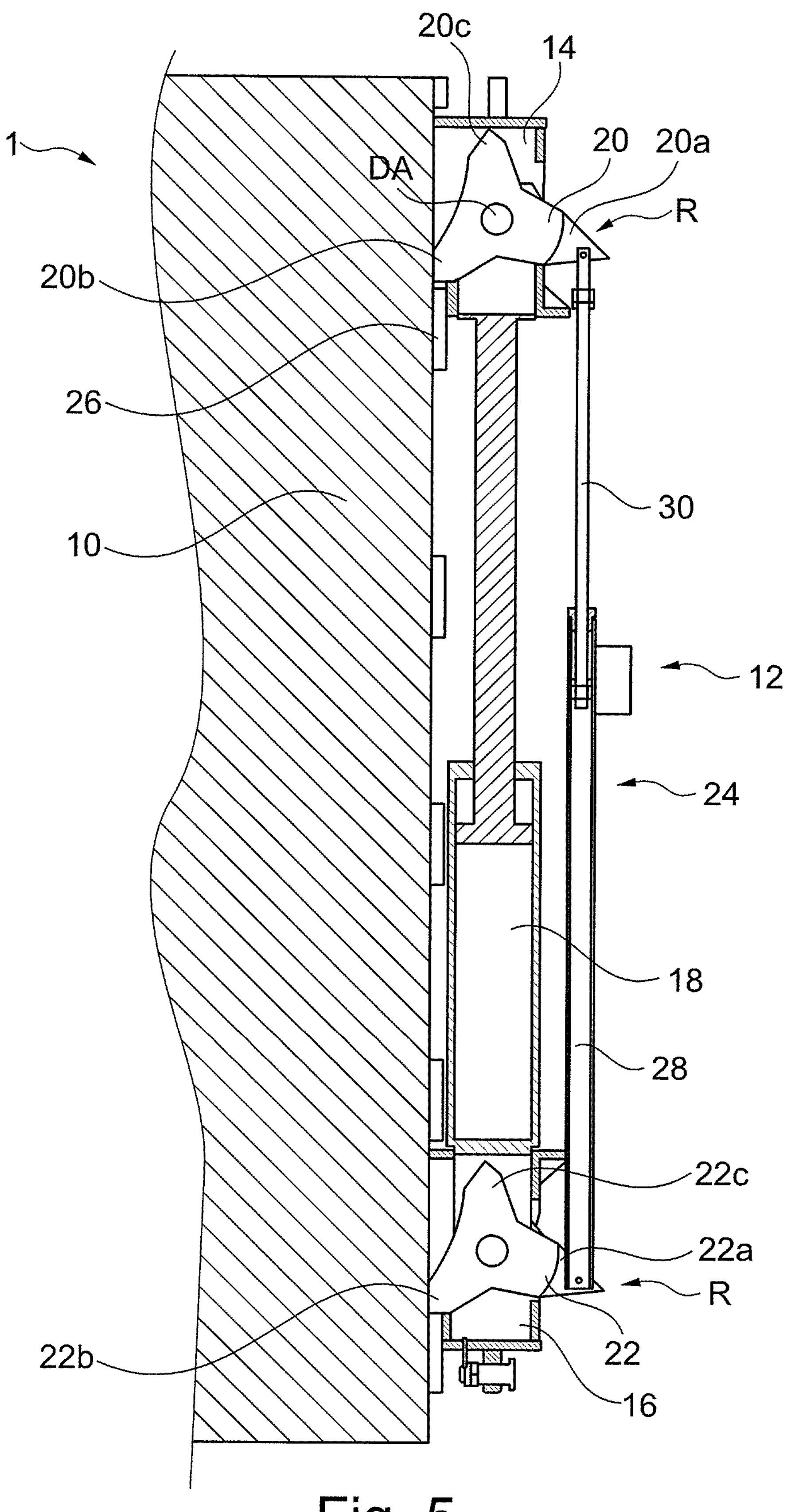

FIG. 5 shows a schematic representation of a self-climbing system for a concrete structural body in accordance with the preferred embodiment of the invention. In the representation shown in FIG. 5, the linear drive 18 is slightly retracted compared to the representation shown in FIG. 4, such that the actuating element 20 of the first climbing head 14 now rests on a latching block 26.

Figure 6:
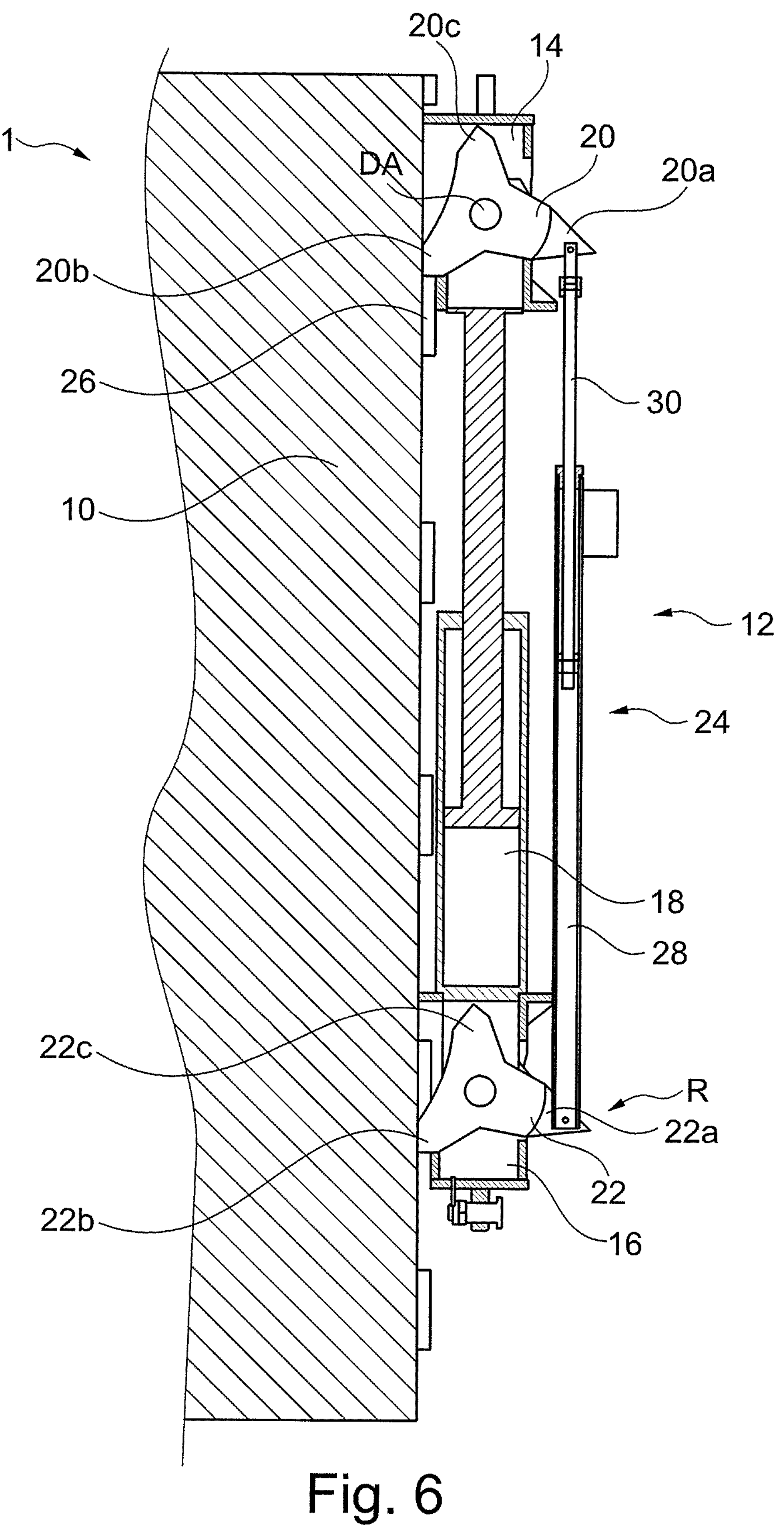

FIG. 6 shows a schematic representation of a self-climbing system for a concrete structural body in accordance with the preferred embodiment of the invention. In the representation shown in FIG. 6, the linear drive 18 is retracted slightly further than in the representation shown in FIG. 5. Due to the actuating element 20 of the first climbing head 14 resting on a latching block 26, the actuating element 22 of the second climbing head 16 is thus moved upwards and is still arranged in the latching position in the representation shown.

Figure 7:
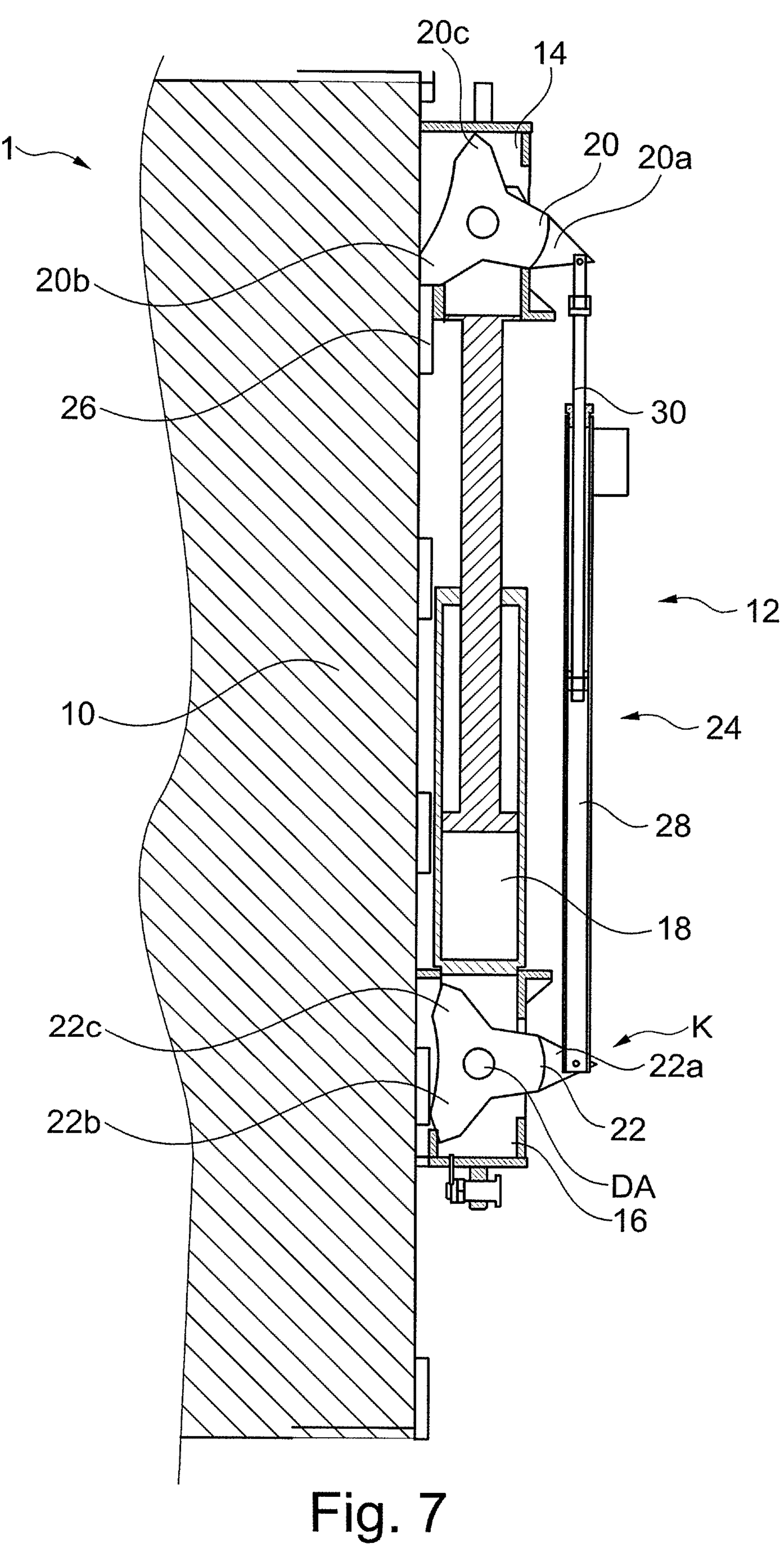

FIG. 7 shows a schematic representation of a self-climbing system for a concrete structural body in accordance with the preferred embodiment of the invention. In the representation shown, the linear drive 18 is retracted slightly further compared to the representation shown in FIG. 7. Due to the actuating element 22 of the second climbing head 16 passing over the latching block 26 the actuating element 22 of the second climbing head 16 is thus moved from the latching position R to the climbing position K.

Figure 8:
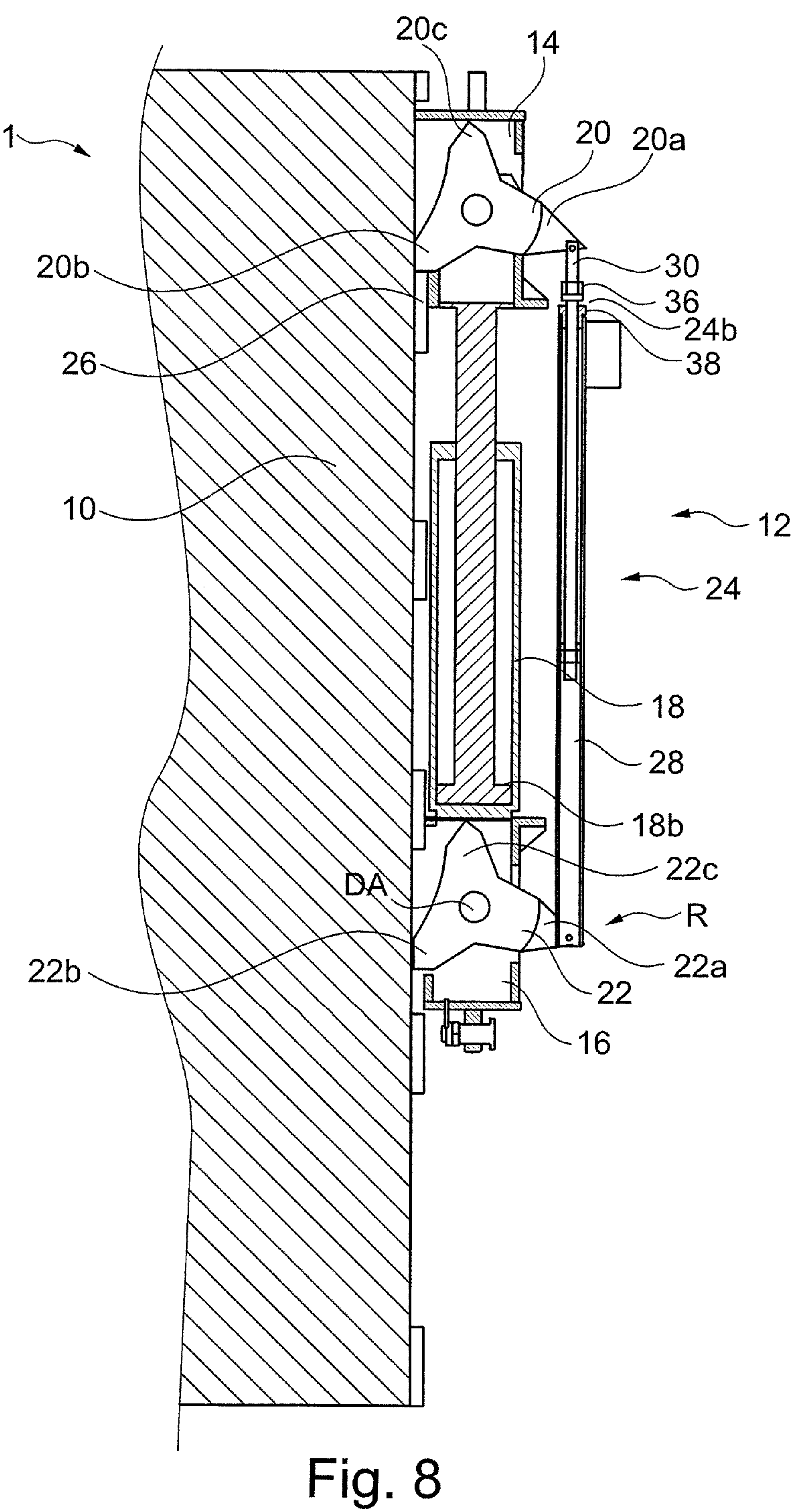

FIG. 8 shows a schematic representation of a self-climbing system for a concrete structural body in accordance with the preferred embodiment of the invention. In the representation shown, the linear drive 18 is arranged in a second axial end position 18*b*, in particular a fully retracted position.

Due to the axially offset arrangement of the control rod 24 compared to the linear drive 18, the actuating element 22 of the second climbing head 16 is thus moved from the climbing position to the latching position R.

Furthermore, the nut 36 arranged on the inner tube 30, which forms a stop, rests on the counter stop 38 of the outer tube 28.

Figure 9:
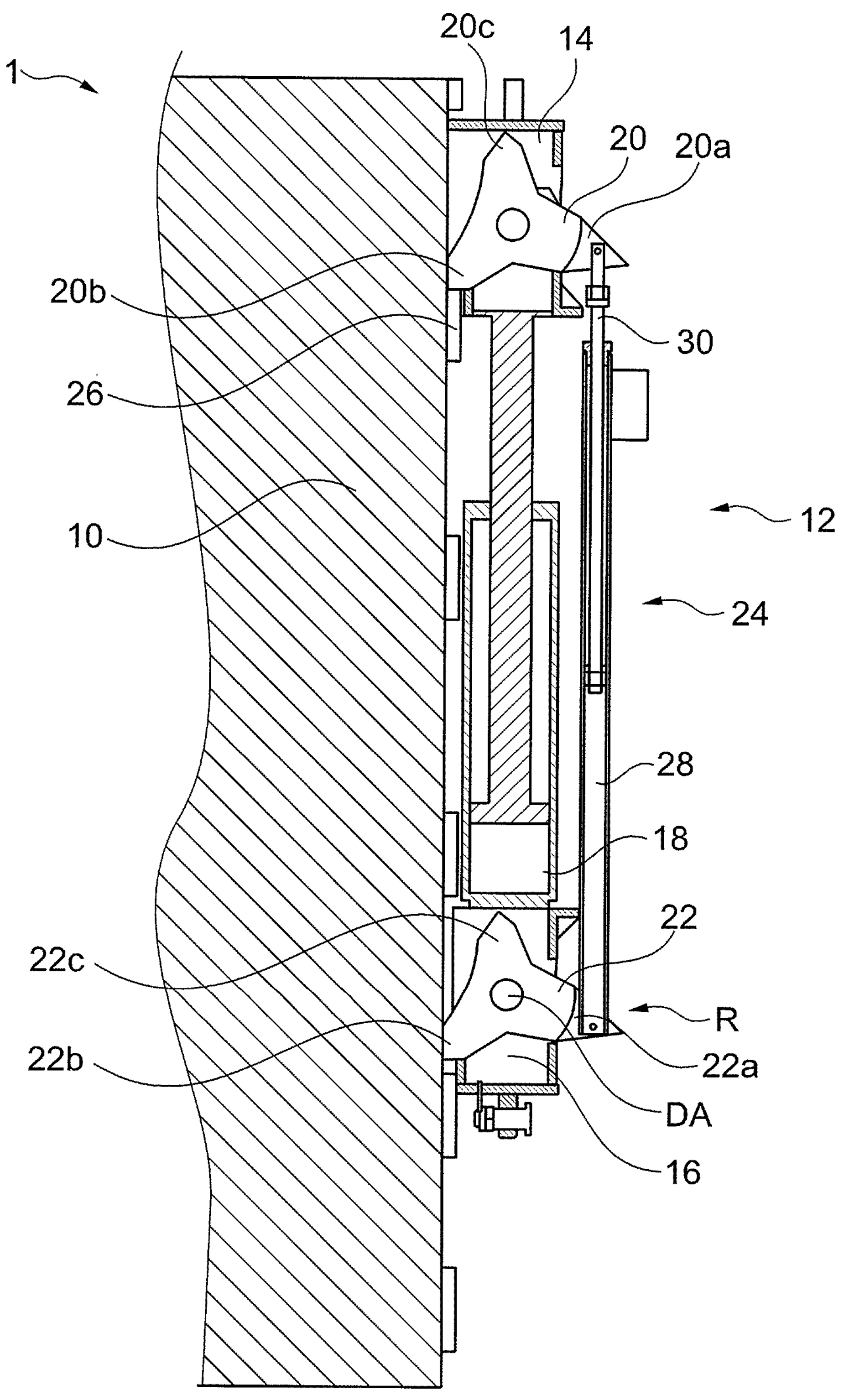

FIG. 9 shows a schematic representation of a self-climbing system for a concrete structural body in accordance with the preferred embodiment of the invention. In the representation shown, the linear drive 18 is extended slightly further compared to the representation shown in FIG. 8. As a result, the actuating element 22 of the second climbing head 16 rests on a latching block 26 in the latching position R.

The movement sequence of the self-climbing system 1 shown in FIG. 1 to FIG. 9 thus advantageously enables both the climbing rail and a console (not shown in the figures) to climb.

In the case of climbing of the console, the difference is that the actuating element now no longer rests on the latching block 26, but lies underneath it. If you mirror the representations, the climbing of the rail can be shown.

Figure 10:
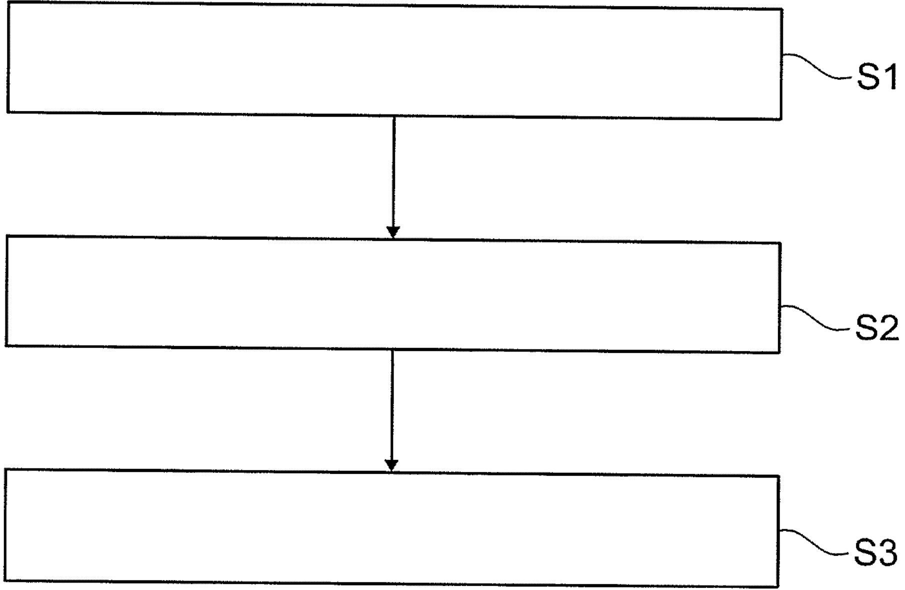

FIG. 10 shows a flowchart of a method for climbing a of climbing unit in accordance with the preferred embodiment of the invention.

The method for climbing of the climbing unit 12 on a climbing rail disposed on a concrete structural body 2 comprises providing S1 a first climbing head 14, a second climbing head 16, and a linear drive 18 connecting the first climbing head 14 to the second climbing head 16.

The method further comprises providing S2 the first climbing head 14 and the second climbing head 16 each having an actuating element 20, 22 adjustable between a climbing position K and a latching position R, in particular of the climbing unit 12, wherein the actuating element 20 of the first climbing head 14 and the actuating element 22 of the second climbing head 16 are connected by a control rod 24.

Furthermore, the method comprises applying S3 a torque D to at least one of the actuating elements 20, 22 in predetermined positions 18*a*, 18*b* of the linear drive 18 by the control rod 24.

Although specific embodiments have been illustrated and described herein, it will be understood by a person skilled in the art that a variety of alternative and/or equivalent implementations exist. It should be noted that the exemplary embodiment or exemplary embodiments are examples only and are not intended to limit the scope, applicability, or configuration in any manner.

Rather, the foregoing summary and detailed description provides the person skilled in the art with a convenient guide to implementing at least one exemplary embodiment, wherein it is understandable that various changes in the functional scope and arrangement of the elements may be made without departing from the scope of the appended claims and their legal equivalents.

In general, this application intends to cover modifications or adaptations or variations of the embodiments set forth herein.

LIST OF REFERENCE SIGNS

1 self-climbing system
2 concrete structural body
10 climbing rail
12 climbing unit
14 first climbing head
16 second climbing head
18 linear drive
18*a* first axial end position
18*b* second axial end position
20, 22 actuating elements
20*a*, 22*a* first flank
20*b*, 22*b* second flank
20*c*, 22*c* third flank
24 control rod
24*a* first axial end position
24*b* second axial end position
26 latching block
28 outer tube
30 inner tube
32 spring element
34 external thread
36 nut
38 counter stop
40 handle D torque
DA axis of rotation
E plane
H1, H2 stroke
K climbing position
R latching position
S1 to S3 method steps

The invention claimed is:

1. A self-climbing system for a concrete structural body, comprising:

a climbing rail; and a climbing unit which is axially movable along the climbing rail and which has a first climbing head, a second climbing head, and a linear drive connecting the first climbing head to the second climbing head, wherein the first climbing head and the second climbing head each have an actuating element which is adjustable between a climbing position and a latching position, wherein the actuating element of the first climbing head and the actuating element of the second climbing head are connected by a control rod, and wherein the control rod is configured, in predetermined positions of the linear drive, to apply a torque to at least one of the actuating elements and to set or position the at least one of the actuating elements in the latching position.

2. The self-climbing system according to claim 1, wherein the actuating element of the first climbing head and the actuating element of the second climbing head, when passing over a latching block of a plurality of latching blocks arranged on the climbing rail caused by axial movement of the linear drive, is movable from the latching position in which the actuating element is arranged at least in portions in the plane of the latching block to the climbing position in which the actuating element is arranged outside the plane of the latching block.

3. The self-climbing system according to claim 1, wherein the control rod has an outer tube and an inner tube or shaft which can be retracted and extended from the outer tube, wherein the control rod, when moving the linear drive to a first axial end position, is configured to generate a switching pulse in order to move the actuating element of the first climbing head or of the second climbing head which is arranged in the climbing position from the climbing position to the latching position.

4. The self-climbing system according to claim 3, wherein a stroke of the linear drive is substantially identical with or with a deviation of up to 15% to a stroke of the control rod, wherein the climbing unit, upon reaching a first axial end position of the control rod, is configured to move the actuating element of the first climbing head or of the second climbing head which is arranged in the climbing position from the climbing position to the latching position.

5. The self-climbing system according to claim 3, wherein the outer tube and the inner tube or the shaft of the control rod have a spring element, comprising a spiral spring, at one stroke end, which initiates the actuation of the actuating element of the first climbing head and/or of the second climbing head.

6. The self-climbing system according to claim 5, wherein the inner tube, at the stroke end, has at least in portions an external thread, at the end of which a nut is arranged, wherein the nut forms a stop which abuts against a counter stop, comprising a diameter reduction, of the outer tube.

7. The self-climbing system according to claim 3, wherein the control rod, when moving the linear drive to a fully retracted or extended position, is configured to generate the switching pulse.

8. A self-climbing system according to claim 1, wherein when the linear drive is moved to a second axial end position, the control rod is configured to move the actuating element of the first climbing head or of the second climbing head which is arranged in the climbing position from the climbing position to the latching position.

9. The self-climbing system according to claim 8, wherein, when the second axial end position of the control rod is reached, the climbing unit is configured to move the actuating element of the first climbing head or of the second climbing head which is arranged in the climbing position from the climbing position to the latching position.

10. The self-climbing system according to claim 1, wherein the actuating element of the first climbing head and the actuating element of the second climbing head are arranged on its axis of rotation on the respective climbing head, and wherein the control rod is arranged on the respective actuating element eccentrically to the axis of rotation.

11. The self-climbing system according to claim 1, wherein the climbing unit is configured in such a manner that, when the climbing unit is operated in the latching position, the actuating element of the first climbing head or of the second climbing head is supported on a latching block arranged on the climbing rail, and wherein the other actuating element can be actuated by the control rod.

12. The self-climbing system according to claim 1, wherein the control rod has a handle which, when actuated, by a user, is configured to move the actuating element of the first climbing head or of the second climbing head between the climbing position and the latching position.

13. The self-climbing system according to claim 1, wherein the linear drive is formed by an actuating cylinder which has a piston rod axially adjustable in a cylinder, wherein the piston rod is connected at an axial end portion to the first climbing head, and wherein the cylinder is connected at an axial end portion to the second climbing head.

14. The self-climbing system according to claim 1, wherein the actuating element of the first climbing head and the actuating element of the second climbing head are each substantially star-shaped, wherein the actuating element has a radially aligned first flank, a radially aligned second flank, and a radially aligned third flank.

15. The self-climbing system according to claim 14, wherein the control rod is connected to the first flank of the actuating element of the first climbing head and of the actuating element of the second climbing head, and wherein the second flank of the actuating elements is configured to rest on the latching block in the latching position of the climbing unit.

16. The self-climbing system according to claim 1, wherein the climbing position and the latching position are of the climbing unit.

17. A method for climbing of a climbing unit on a climbing rail arranged on a concrete structural body, comprising the steps:

providing a first climbing head, a second climbing head, and a linear drive connecting the first climbing head to the second climbing head;

providing the first climbing head and the second climbing head each with an actuating element adjustable between a climbing position and a latching position, wherein the actuating element of the first climbing head and the actuating element of the second climbing head are connected by a control rod; and applying a torque to at least one of the actuating elements in predetermined positions of the linear drive by the control rod, wherein when the linear drive is moved to a first axial end position, the control rod generates a switching pulse to move the actuating element of the first climbing head or of the second climbing head which is arranged in the climbing position from the climbing position to the latching position.

18. The method according to claim 17, wherein the actuating element of the first climbing head and the actuating element of the second climbing head, when passing over a latching block of a plurality of latching blocks arranged on the climbing rail caused by axial movement of the linear drive, is moved from the latching position in which the actuating element is arranged at least in portions in the plane of the latching block to the climbing position in which the actuating element is arranged outside the plane of the latching block.

19. A method for climbing of a climbing unit on a climbing rail arranged on a concrete structural body, comprising the steps:

providing a first climbing head, a second climbing head, and a linear drive connecting the first climbing head to the second climbing head;

providing the first climbing head and the second climbing head each with an actuating element adjustable between a climbing position and a latching position, wherein the actuating element of the first climbing head and the actuating element of the second climbing head are connected by a control rod; and applying a torque to at least one of the actuating elements in predetermined positions of the linear drive by the control rod, wherein the climbing position and the latching position are of the climbing unit.

* * * * *